United States Patent [19]

Soukup

[11] Patent Number: 5,192,607
[45] Date of Patent: Mar. 9, 1993

[54] DISPERSANT FOR CARBON BLACK-FILLED FOAM

[75] Inventor: Thomas G. Soukup, Clearwater, Fla.

[73] Assignees: The Celotex Corporation, Tampa, Fla.; Apache Building Products Company, Meridian, Miss.

[21] Appl. No.: 922,419

[22] Filed: Jul. 31, 1992

Related U.S. Application Data

[62] Division of Ser. No. 823,100, Jan. 21, 1992, Pat. No. 5,137,930, which is a division of Ser. No. 751,393, Aug. 28, 1991, Pat. No. 5,149,722.

[51] Int. Cl.$^5$ .............................. B32B 3/26; B05D 3/02
[52] U.S. Cl. .................................. 428/314.4; 427/373; 428/317.9; 521/99; 521/82; 521/88; 521/114
[58] Field of Search ............... 428/314.4, 317.9; 427/373; 521/99, 82, 88, 114

[56] References Cited

U.S. PATENT DOCUMENTS

| | | | |
|---|---|---|---|
| 3,486,967 | 12/1969 | Fisher | 161/160 |
| 3,499,848 | 3/1970 | Weisman | 260/2.5 |
| 3,625,872 | 12/1971 | Ashida | 260/2.5 |
| 3,640,920 | 2/1972 | Cear | 260/2.5 |
| 4,243,755 | 1/1981 | Marx et al. | 521/99 |
| 4,263,408 | 4/1981 | Meyborg et al. | 521/51 |
| 4,278,770 | 7/1981 | Chandalia et al. | 521/99 |
| 4,282,329 | 8/1981 | von Bonin et al. | 521/99 |
| 4,286,004 | 8/1981 | Dahmen et al. | 428/95 |
| 4,288,559 | 9/1981 | Illger et al. | 521/55 |
| 4,347,330 | 8/1982 | Demou et al. | 521/110 |
| 4,438,221 | 3/1984 | Fracalossi et al. | 521/55 |
| 4,767,795 | 8/1988 | Adam et al. | 521/99 |
| 4,795,763 | 1/1989 | Gluck et al. | 521/99 |
| 5,137,930 | 8/1992 | Soukup | 521/99 |
| 5,149,722 | 9/1992 | Soukup | 521/99 |

FOREIGN PATENT DOCUMENTS

0248602 12/1987 European Pat. Off. .

Primary Examiner—Morton Foelak
Attorney, Agent, or Firm—Charles W. Vanecek

[57] ABSTRACT

A closed cell, rigid, polymer foam comprising the reaction product of a polyisocyanate and an isocyanatereactive compound in the presence of (a) a foaming agent, (b) at least about 2 percent by weight of carbon black, based on the weight of the polymer in the foam, and (c) a capped polyoxyalkylene compound which helps bring about a uniform dispersion of the carbon black throughout the foam so that the aged k-factor of the foam is below the aged k-factor of the corresponding unfilled foam.

26 Claims, 1 Drawing Sheet

DISPERSANT FOR CARBON BLACK-FILLED FOAM

This is a division of application Ser. No. 07/823,100, filed Jan. 21, 1992, now U.S. Pat. No. 5,137,930, which is a division of application Ser. No. 07/751,393, filed Aug. 28, 1991, now U.S. Pat. No. 5,149,722.

BACKGROUND OF THE INVENTION

1. Field of the Invention

This invention relates to the formation of dispersions of carbon black for use in the production of foam insulating products, particularly polyurethane and polyisocyanurate foams.

2. Description of the Prior Art

The use of carbon black to reduce the aged k-factor and hence improve the insulation value of closed cell, rigid, polymer foams is disclosed in U.S. Pat. No. 4,795,763. This patent establishes that uniformly dispersed carbon black filler effects a significant permanent reduction in the aged k-factor of foams. A failure to properly disperse the carbon black and stabilize the dispersion can result in clogging of the foam production equipment and the production of foam wherein the carbon black is clustered at the foam cell struts or highly agglomerated in a portion of the cell walls to yield little or no improvement in insulation value. It is accordingly highly desirable to find ways to simply and economically disperse carbon black in the ingredients employed in foam production and stabilize the dispersion, and thereafter form highly insulating foams from the dispersed mixture.

OBJECTS OF THE INVENTION

It is therefore an object of the present invention to produce closed cell, rigid foam plastic, especially polyurethane and polyisocyanurate foam, which contains a well-dispersed carbon black filler and exhibits overall good properties, including excellent thermal insulative properties, good dimensional stability, thermal resistance and compressive strength and acceptable friability.

It is another object of the present invention to provide an improved method for the production of a carbon black-filled, rigid, highly insulating foam plastic, wherein the carbon black does not clog the foam production equipment and becomes uniformly dispersed in the cells of the foam plastic product.

It is a further object of the present invention to provide an additive which helps to disperse carbon black in the ingredients employed in the production of filled, closed cell, rigid foam materials and stabilize the dispersion, and to thereby bring about the production of superior insulating foams.

BRIEF DESCRIPTION OF DRAWING

The invention will now be described with reference to the accompanying drawing which is a side schematic elevation of an apparatus suitable for producing a rigid foam laminate in accordance with the present invention.

DESCRIPTION OF THE INVENTION

The above objects have been achieved by the use of a polyoxyalkylene compound in the production of carbon black-filled foam. The polyoxyalkylene additive helps to bring about a uniform dispersion of the carbon black in the foam-forming composition and maintain the dispersion without agglomeration of the carbon black during foaming, whereby the initial and long-term aged k-factors of the resultant foam are especially low, as compared to the unfilled foam of comparable density. The dispersion stabilizer suitably is rendered nonreactive with isocyanate groups by the capping of its oxyalkylene chain(s). The polyoxyalkylene compound can be represented broadly by the structural formula $$\text{capping group} - (\text{polyoxyalkylene chain})_t - Z,$$

wherein Z is an organic radical selected from aromatic, aliphatic, cycloaliphatic and heterocyclic radicals, and combinations of these, and t is an integer from 1 to 8. Any carbon black which can be uniformly dispersed in the foam at levels of about 1-20, preferably 2 to 10, weight %, based on the weight of the polymer in the foam, can be used for improvement of insulation value.

The carbon black and polyoxyalkylene dispersing agent can be added to one or more of the ingredients used to make the foam and mixed therewith. For example, in the production of the preferred carbon black-filled polyurethane and polyisocyanurate rigid foams of the invention, the dispersing agent advantageously may be used to assist in the dispersion of the carbon black in either the polyisocyanate or the polyol or both. The dispersion(s) formed is then employed in the foam preparation. Superior insulating foams have been produced by dispersing the carbon black in the isocyanate component, and utilizing as the dispersion stabilizer a polyoxyalkylene adduct having a reduced hydroxyl number produced by reacting the terminal hydroxyl group(s) with a capping agent. The process of capping functional groups is well known and common agents for masking the functionality of the hydroxyl group are agents which produce esters and ethers. Polyalkylene oxide adducts, whose terminal hydroxyl groups suitably may be etherified or esterified so as to be rendered substantially non-reactive with the isocyanate groups during foam production, can be represented by the structural formula $$R-(\text{polyoxyalkylene chain})-R''$$

wherein R and R'' independently represent a terminal group which is nonreactive with isocyanate groups, and may be selected from alkoxy, alkaryloxy, or acyloxy.

A particularly suitable oxyalkylene compound of the invention is a terminally esterified or etherified adduct of the general formula $$R-(CHR'-CH_2O)_n-CHR'-CH_2R''$$

wherein R and R'', which are identical or different, denote a linear or branched alkoxy radical with 1 to 22 C atoms, an alkaryloxy radical with 10 to 18 C atoms, or an acyloxy radical with 1 to 18 C atoms, R' denotes hydrogen or a methyl radical, and n denotes a number between 0 and 20.

The preparation of the oxyalkylene additives is well known. One way of preparing them, for example, is to esterify polyethylene glycols with carboxylic acids by the usual and known esterification methods. Linear as well as branched carboxylic acids with 1 to 18 C atoms can be used. Preferred, however, are lower carboxylic acids, such as acetic acid, which, in turn, is preferably used in the form of its anhydride for the esterification.

The etherification of the polyalkylene oxide adducts with lower alkyl radicals is mainly effected by means of the known alkylation reagents such as methyl chloride, butyl chloride, or dimethyl or diethyl sulfate.

On the other hand, it is possible first to prepare esterified or etherified polyalkylene oxide adducts by adding alkylene oxide to carboxylic acids, alcohols or alkyl phenols in known manner and then esterifying or etherifying the free hydroxyl group by known methods. The alcohols used according to this method can be linear or branched and contain 1 to 22 C atoms, alcohols with 1 to 18 C atoms, and particularly 1 to 13 C atoms, being generally preferred. As alkyl phenols, mainly the commercially available octyl and nonyl phenols are used, butyl and dodecyl phenols being likewise used for this purpose. The carboxylic acids used according to this method are linear or branched and contain to 1 to 18 C atoms. A highly effective dispersant is a capped alkoxylated (especially ethoxylated) nonyl phenol, which preferably contains about 1 to 4, more preferably about 1.5 to 2 moles of ethylene oxide per mole of nonyl phenol. Acetic anhydride is a preferred capping agent.

The presence of a sufficiently large alkyl radical, such as one containing 8 to 14 C atoms (e.g., a nonyl or dodecyl group) may make it unnecessary to alkoxylate for effective dispersing performance. A capped and nonalkoxylated phenol, such as nonylphenyl acetate, may therefore be useful as a dispersing agent.

The dispersing agent is incorporated in the foam-forming mixture in sufficient amount to bring about a fine dispersion of carbon black particles and stabilize the dispersion against re-agglomeration during the foaming process. The concentration of dispersing agent is advantageously within the range of about 1 to 50 weight percent, preferably 2 to 35 weight percent, and more preferably 15 to 25 weight percent, based on the total weight of the carbon black.

The amount of carbon black in the foam should be sufficient to obtain the desired level of improved insulative properties. Typically, the amount ranges from about 3% to 10% by weight of the solid foam polymer, such as 4% to 9%, particularly 5.0% to 6.5%. The particle size of the carbon black particles to be employed may vary, but generally the carbon black has a mean particle diameter of from about 10 to 150, preferably from 20 to 100, and more preferably from 30 to 75, nm.

The carbon black may be any of the different kinds available, such as lampblack, channel black, gas furnace black, oil furnace black and thermal black. Particularly suitable carbon blacks are non-electroconductive and have an average particle diameter which is preferably greater than about 20 and more preferably greater than about 30, nm. This carbon black material has a specific surface area which is preferably less than about 200, more preferably less than about 142 and most preferably less than about 100, $m^2/g$. Pelleted types of carbon blacks have been found especially suitable for large-scale processing.

A preferred carbon black is a standard rubber-grade carbon black falling under the classification of ASTM-550. This small-particle, high structured black provides a highly stable carbon black/isocyanate dispersion. Its high structure serves to reduce grinding time while still producing a fine particle size distribution. The carbon black/isocyanate dispersion containing the polyoxyalkylene dispersing aid is advantageously ground to a Hegman level of 8. There is a concomitant considerable increase in dispersion viscosity due to the fine dispersion, but the high viscosity is handleable by the use of conventional processing techniques and equipment, such as large diameter piping, high pressure pumps, static mixers, etc.

Two preferred ASTM-550 grade carbon blacks are pelleted products of Columbian Chemicals Company, sold under the trademark, Raven 520, and of Cabot Corporation, sold under the trademark, Black Pearls 280, which both have a mean particle diameter of 41 nanometers.

Various methods for introducing and dispersing the carbon black and polyoxyalkylene dispersant into the foam-forming system can be employed. Any machine already known in the art for dispersing carbon black in organic media can be used, such as, for example, a Banbury mixer, a roll mill, a single- or twin-screw extruder, a media mill and the like. It is generally preferred to utilize the machine for the formation of a pre-blend of the carbon black and the polyoxyalkylene compound in the foam-forming ingredient(s) which constitutes the best medium for providing the highest loading of finely divided and well-dispersed filler particles and also a workable viscosity. This pre-blended mixture is next thoroughly mixed with the remainder of the foam-forming material, and the resultant total mixture is foamed and cured. Dispersion of the carbon black is conducted to provide the finest grind of particles economically attainable for easier processing and extending the life of the process equipment.

Preferred carbon black-filled organic foams of the invention comprise the reaction products in the presence of a foaming agent of polyisocyanates and polyfunctional, active hydrogen-containing compounds (hereinafter called "isocyanate-reactive compounds"), especially polyhydroxyl compounds. In the manufacture of the preferred rigid cellular polyurethanes and polyisocyanurates, it is common practice to utilize two preformulated components, commonly called the A-component and the B-component. Typically, the A-component contains the isocyanate compound that must be reacted with the polyol of the B-component to form the foam, and the balance of the foam-forming ingredients are distributed in these two components or in yet another component or components. The polyoxyalkylene additive is advantageously used to help disperse the carbon black particles in the polyisocyanate, and the resultant dispersion may then be combined with any other A-component ingredient(s) and the remaining foaming components. The reaction may be carried out in the presence of catalysts, auxiliaries and additives as required (e.g., a surfactant).

The polyisocyanate component employed in the preparation of the carbon black-filled rigid foams of the invention can be any of the polyisocyanates known to be useful in the art of polymer formation. Suitable organic polyisocyanates include aliphatic, cycloaliphatic, araliphatic, aromatic and heterocyclic polyisocyanates and combinations thereof characterized in having two or more isocyanate (NCO) groups per molecule. Aromatic polyisocyanates are especially preferred. The viscosity of the polyisocyanates suitably is in the range of 100 to 5000 centipoise at 25° C.

Among the many isocyanates suitable for the practice of the subject invention are, for example, tetramethylene, hexamethylene, octamethylene and decamethylene diisocyanates, and their alkyl substituted homologs, 1,2-, 1,3- and 1,4-cyclohexane diisocyanates, 2,4- and 2,6-methylcyclohexane diisocyanates, 4,4'- and 2,4'-dicyclohexyl-diisocyanates, 4,4'- and 2,4'-dicyclohexylmethane diisocyanates, 1,3,5-cyclohexane triisocyanates, saturated (hydrogenated) polymethylene polyphenyl polyisocyanates, isocyanatomethylcyclohexane isocyanates, isocyanatoethyl-cyclohexane isocyanates, bis(isocyanatomethyl)-cyclohexane diisocyanates, 4,4'- and 2,4'-bis(isocyanatomethyl) dicyclohexane, isophorone diisocyanate, 1,2-, 1,3- and 1,4-phenylene diisocyanates, 2,4- and 2,6-toluene diisooyanates, 2,4'-, 4,4'- and 2,2-biphenyl diisooyanates, 2,2'-, 2,4'- and 4,4'-diphenylmethane diisocyanates, polymethylene polyphenyl polyisocyanates (polymeric MDI), and aromatic aliphatic isocyanates such as 1,2-, 1,3-, and 1,4-xylylene diisocyanates.

Organic isocyanates containing heteroatoms may also be utilized, for example those derived from melamine. Modified polyisocyanates, such as carbodiimide or isocyanurate can also be employed. Liquid carbodiimide group- and/or isocyanurate ring-containing polyisocyanates having isocyanate contents from 15 to 33.6 percent by weight, preferably from 21 to 31 percent by weight, are also effective, for example, those based on 4,4'-, 2,4'-, and/or 2,2'-diphenylmethane diisocyanate and/or 2,4- and/or 2,6-toluene diisocyanate, and preferably 2,4- and 2,6-toluene diisocyanate and the corresponding isomer mixtures, 4,4'-, 2,4', and 2,2'-diphenylmethane diisocyanates as well as the corresponding isomer mixtures, for example, mixtures of 4,4'- and 2,4'-diphenylmethane diisocyanates, mixtures of diphenylmethane diisocyanates and polyphenyl polymethylene polyisocyanates (polymeric MDI), and mixtures of toluene diisocyanates and polymeric MDI. Preferred, however, are the aromatic diisocyanates and polyisocyanates. Particularly preferred are 2,4-, and 2,6-toluene diisocyanate and mixtures thereof (TDI), 2,4'-, 2,2'- and 4,4'-diphenylmethane diisocyanate (MDI), polymethylene polyphenyl polyisocyanates (polymeric MDI), and mixtures of the above preferred isocyanates.

Most particularly preferred are the polymeric MDI's Preferred polymethylene polyphenylisocyanates desirably have a functionality of at least 2.1 and preferably 2.5 to 3.2. These preferred polymethylene polyphenylisocyanates generally have an equivalent weight between 120 and 180 and preferably have an equivalent weight between 130 and 145. Especially high quality carbon black-filled foams have been produced from polymeric MDI's having a viscosity above 1000, and preferably between about 1700-2500, centipoise at 25° C.

Highly useful organic polyisocyanates are the isocyanate terminated quasi-prepolymers. These quasi-prepolymers are prepared by reacting excess organic polyisocyanate or mixtures thereof with a minor amount of an active hydrogen-containing compound. Suitable active hydrogen containing compounds for preparing the quasiprepolymers hereof are those containing at least two active hydrogen-containing groups which are isocyanate reactive. Typifying such compounds are hydroxyl-containing polyesters, polyalkylene ether polyols, hydroxyl-terminated polyurethane oligomers, polyhydric polythioethers, ethylene oxide adducts of phosphorous-containing acids, polyacetals, aliphatic polyols, aliphatic thiols including alkane, alkene and alkyne thiols having two or more SH groups; as well as mixtures thereof. Compounds which contain two or more different groups within the above-defined classes may also be used such as, for example, compounds which contain both an SH group and an OH group. Highly useful quasiprepolymers are disclosed in U.S. Pat. No. 4,791,148 and U.S. application Ser. No. 07/342,508, filed Apr. 24, 1989, the disclosures of which with respect to the quasiprepolymers are hereby incorporated by reference.

In addition to the polyisocyanate, the foam-forming formulation also contains an organic compound containing at least 1.8 or more isocyanate-reactive groups per molecule (an isocyanate-reactive compound). Suitable such compounds include polyols, polyamines, polyacids, polymercaptans and like compounds. Preferred isocyanate-reactive compounds are the polyester and polyether polyols. Particularly preferred are polyester polyols or mixtures of polyester and polyether polyols.

The polyester polyols can be prepared by known procedures from a polycarboxylic acid component comprising a polycarboxylic acid or acid derivative, such as an anhydride or ester of the polycarboxylic acid, and any polyol component. The polyol component advantageously comprises a glycol(s) or a glycol-containing mixture of polyols. The polyacid and/or polyol components may, of course, be used as mixtures of two or more compounds in the preparation of the polyester polyols. Particularly suitable polyester polyols for use in the foam production are aromatic polyester polyols containing phthalic acid residues.

The production of the polyester polyols is accomplished by simply reacting the polycarboxylic acid or acid derivative with the polyol component in a known manner until the hydroxyl and acid values of the reaction mixture fall in the desired range. The reaction typically is performed at temperatures from about 150° C. to 250° C. for a period from about 1 to 10 hours. The reaction can be carried out as a batch process or continuously. When present, excess glycol can be distilled from the reaction mixture during and/or after the reaction, such as in the preparation of low free glycol-containing polyester polyols usable in the present invention. Normally, an effective amount of catalyst is added to promote the present reaction. Any conventional esterification or transesterification catalyst (single compound or mixture of compounds) can be used. Suitable catalysts include organotin compounds, particularly tin compounds of carboxylic acids, such as stannous octoate, stannous oleate, stannous acetate, stannous laurate, dibutyl tin dilaurate, and other such tin salts. Additional suitable metal catalysts include tetraisopropyl titanate, and other such titanate salts, and the like.

After transesterification or esterification, the reaction product can be reacted with an alkylene oxide to form a polyester polyol mixture of the invention. This reaction desirably is catalyzed. The temperature of this process should be from about 80° C. to 170° C., and the pressure should generally range from about 1 to 40 atmospheres.

The polycarboxylic acid component may be aliphatic, cycloaliphatic, aromatic and/or heterocyclic and may optionally be substituted, for example, by halogen atoms, and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; pyromellitic dianhydride;

hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid; terephthalic acid dimethyl ester and terephthalic acid-bis glycol ester.

Polyester polyols whose acid component advantageously comprises at least about 30% by weight of phthalic acid residues are particularly useful. By phthalic acid residue is meant the group While the aromatic polyester polyols can be prepared from substantially pure reactant materials, more complex ingredients are advantageously used, such as the sidestream, waste or scrap residues from the manufacture of phthalic acid, terephthalic acid, dimethyl terephthalate, polyethylene terephthalate, and the like. Particularly suitable compositions containing phthalic acid residues for use in the invention are (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid and (h) trimellitic anhydride, and (i) combinations thereof. These compositions may be converted by reaction with the polyols of the invention to polyester polyols through conventional transesterification or esterification procedures.

A preferred polycarboxylic acid component for use in the preparation of the aromatic polyester polyols is phthalic anhydride. This component can be replaced by phthalic acid or a phthalic anhydride bottoms composition, a phthalic anhydride crude composition, or a phthalic anhydride light ends composition, as such compositions are defined in U.S. Pat. No. 4,529,744.

Other preferred materials containing phthalic acid residues are polyalkylene terephthalates, especially polyethylene terephthalate (PET), residues or scraps.

Still other preferred residues are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of by-products. The desired DMT and the volatile methyl p-toluate by-product are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process, or, if desired, the residue can be processed further, as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Cape Industries, Inc. sells DMT process residues under the trademark Terate® 101. DMT process residues having a different composition but still containing the aromatic esters and acids are also sold by DuPont and others. The DMT process residues to be transesterified in accordance with the present invention preferably have a functionality at least slightly greater than 2.

Such suitable residues include those disclosed in U.S. Pat. Nos. 3,647,759, 4,411,949, 4,714,717, and 4,897,429, the disclosures of which with respect to the residues are hereby incorporated by reference.

The polyester polyols are prepared from the above described polycarboxylic acid components and any polyol component. The polyols can be aliphatic, cycloaliphatic, aromatic and/or heterocyclic. Low molecular weight aliphatic polyhydric alcohols, such as aliphatic dihydric alcohols having no more than about 20 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like may also be used. Moreover, the polycarboxylic acid(s) may be condensed with a mixture of polyhydric alcohols and amino alcohols.

A preferred polyol component is a glycol. The glycols may contain heteroatoms (e.g., thiodiglycol) or may be composed solely of carbon, hydrogen, and oxygen. They are advantageously simple glycols of the general formula $C_nH_{2n}(OH)_2$ or polyglycols distinguished by intervening ether linkages in the hydrocarbon chain, as represented by the general formula $C_nH_{2n}O_x(OH)_2$. In a preferred embodiment of the invention, the glycol is a low molecular weight aliphatic diol of the generic formula:

HO—R—OH wherein R is a divalent radical selected from the group consisting of:
(a) alkylene radicals each containing from 2 through 6 carbon atoms, and
(b) radicals of the formula:

wherein $R^1$ is an alkylene radical containing from 2 through 6 carbon atoms, and m is an integer of from 1 through 4, and
(c) mixtures thereof.

Examples of suitable polyhydric alcohols include: ethylene glycol; propylene glycol—(1,2) and —(1,3); butylene glycol—(1,4) and —(2,3); hexane diol—(1,6); octane diol—(1,8); neopentyl glycol; 1,4-bishydroxymethyl cyclohexane; 2-methyl-1,3-propane diol; glycerin; trimethylolpropane; trimethylolethane; hexane triol-(1,2,6); butane triol-(1,2,4); pentaerythritol; quinol; mannitol; sorbitol; methyl glucoside; diethylene glycol; triethylene glycol; tetraethylene glycol and higher polyethylene glycols; dipropylene glycol and higher polypropylene glycols as well as dibutylene glycol and higher polybutylene glycols. Especially suitable polyols are alkylene glycols and oxyalkylene glycols, such as ethylene glycol, diethylene glycol, dipropylene glycol, triethylene glycol, tripropylene glycol, tetraethylene glycol, tetrapropylene glycol, trimethylene glycol and tetramethylene glycol, and 1,4-cyclohexanedimethanol (1,4-bis-hydroxymethyl-cyclohexane).

The term "polyester polyol" as used in this specification and claims includes any minor amounts of unreacted polyol remaining after the preparation of the polyester polyol and/or unesterified polyol (e.g., glycol) added after the preparation. The polyester polyol can advantageously include up to about 40 weight percent free glycol.

The polyester polyols advantageously have an average functionality of about 1.8 to 8, preferably about 1.8 to 5, and more preferably about 2 to 2.5. Their hydroxyl number values generally fall within a range of about 15 to 750, preferably about 30 to 550, and more preferably about 100 to 550, and their free glycol content generally is from about 0 to 40, preferably from 2 to 30, and more preferably from 2 to 15, weight percent of the total polyester polyol component.

Examples of suitable polyester polyols are those derived from PET scrap and available under the designation Chardol 170, 336A, 560, 570, 571 and 572 from Chardonol and Freol 30-2150 from Freeman Chemical. Examples of suitable DMT derived polyester polyols are Terate® 202, 203, 204, 254 and 254A polyols, which are available from Cape Industries. Phthalic anhydride derived-polyester polyols are commercially available under the designation Pluracol® polyol 9118 from BASF Corporation, and Stepanol PS-2002, PS-2402, PS-2502A, PS-2502, PS-2522, PS-2852, PS-2852E, PS-2552, and PS-3152 from Stepan Company.

The polyols which can be employed alone or in combination with polyester polyols in the preparation of the carbon black-filled polyurethane and polyisocyanurate foam compositions of the invention include monomeric polyols and polyether polyols. The polyether polyols are found particularly useful in preparing rigid polyurethane foams. Polyether polyols of this type are the reaction products of a polyfunctional active hydrogen initiator and a monomeric unit such as ethylene oxide, propylene oxide, butylene oxide and mixtures thereof, preferably propylene oxide, ethylene oxide or mixed propylene oxide and ethylene oxide. The polyfunctional active hydrogen initiator preferably has a functionality of 2-8, and more preferably has a functionality of 3 or greater (e.g., 4-8).

A wide variety of initiators may be alkoxylated to form useful polyether polyols. Thus, for example, polyfunctional amines and alcohols of the following type may be alkoxylated: monoethanolamine, diethanolamine, triethanol-amine, ethylene glycol, polyethylene glycol, propylene glycol, hexanetriol, polypropylene glycol, glycerine, sorbitol, trimethylolpropane, pentaerythritol, sucrose and other carbohydrates. Such amines or alcohols may be reacted with the alkylene oxide(s) using techniques known to those skilled in the art. The hydroxyl number which is desired for the finished polyol would determine the amount of alkylene oxide used to react with the initiator. The polyether polyol may be prepared by reacting the initiator with a single alkylene oxide, or with two or more alkylene oxides added sequentially to give a block polymer chain or at once to achieve a random distribution of such alkylene oxides. Polyol blends such as a mixture of high molecular weight polyether polyols with lower molecular weight polyether polyols can also be employed.

The polyurethane foams can be prepared by reacting the polyol and polyisocyanate on a 0.7:1 to 1.1:1 equivalent basis. In an advantageous embodiment of the invention wherein the polyester polyols are combined with another polyol(s) to produce polyurethane foams, the polyester polyols can comprise about 5 to 100, preferably about 5 to 75, and more preferably about 20 to 50, weight percent of the total polyol content in the foam preparations. The polyisocyanurate foams of the invention are advantageously prepared by reacting the polyisocyanate with a minor amount of polyol, such as sufficient polyol to provide about 0.10 to 0.70 hydroxyl equivalents of polyol per equivalent of said polyisocyanate, wherein the polyester polyol comprises about 5 to 100, and preferably about 50 to 100, weight percent of the total polyol content in the foam preparations.

Any suitable blowing agent can be employed in the foam compositions of the present invention. Water, air, nitrogen, carbon dioxide, readily volatile organic substances and/or compounds which decompose to liberate gases (e.g., azo compounds may be used). Typically, these blowing agents are liquids having a boiling point between minus 50° C. and plus 100° C. and preferably between 0° C. and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_2H$, $CClFHCClF_2$, trifluorochloropropane, difluorodichloromethane, 1-fluoro-1,1-dichloroethane, 2,2,2-trifluoro-1,1-dichloroethane, 1,1-difluoro-1-chloroethane, chlorodifluoromethane, methylene chloride, diethylether, isopropyl ether, n-pentane, cyclopentane, 2-methylbutane, methyl formate, carbon dioxide and mixtures thereof. Trichlorofluoromethane is a preferred blowing agent.

In a preferred embodiment of the invention, the foams are produced using a froth-foaming method, such as the one disclosed in U.S. Pat. No. 4,572,865, whose disclosure is hereby incorporated by reference. In this method, the frothing agent can be any material which is inert to the reactive ingredients and easily vaporized at atmospheric pressure. The frothing agent advantageously has an atmospheric boiling point of $-50°$ C. to 10° C., and includes carbon dioxide, dichlorodifluoromethane, monochlorodifluoromethane, trifluoromethane, monochlorotrifluoromethane, monochloromethane, monochloropentafluoroethane, vinylfluoride, vinylidenefluoride, 1,1-difluoroethane, 1,1,1-trichlorodifluoroethane, and the like. Particularly preferred are dichlorodifluoromethane and monochlorodifluoromethane. A higher boiling blowing agent is desirably used in conjunction with the frothing agent. The blowing agent is a gaseous material at the reaction temperature and advantageously has an atmospheric boiling point ranging from about 10° to 80° C. Suitable blowing agents include trichlorofluoromethane, 1,1,2-trichloro-1,2,2-trifluoroethane, acetone, pentane, and the like, preferably trichlorofluoromethane.

The foaming agents, e.g., trichlorofluoromethane blowing agent or combined trichlorofluoromethane blowing agent and dichlorodifluoromethane frothing agent, are employed in an amount sufficient to give the resultant foam the desired bulk density which is generally between 0.5 and 10, preferably between 1 and 5, and most preferably between 1.5 and 2.5, pounds per cubic foot. The foaming agents generally comprise from 1 to 30, and preferably comprise from 5 to 20 weight percent of the composition. When a foaming agent has a boiling point at or below ambient, it is maintained under pressure until mixed with the other components. Alternatively, it can be maintained at subambient temperatures until mixed with the other components. Mixtures of foaming agents can be employed. Hydrogen-containing halocarbons known as HCFC's, which are considered environmentally acceptable in that they theoretically have minimal effect on ozone depletion, may be substituted for the fully halogenated chlorofluorocarbons such as $CFCl_3$(CFC-11) and $CF_2Cl_2$(CFC-12).

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "Y-10222", "L-5420" and "L-5340", from the Dow Corning Corporation under the trade names "DC-193" and "DC-5315", and from Goldschmidt Chemical Corporation under the tradenames "B-8408" and "B-8407". Other suitable surfactants are those described in U.S. Pat. Nos. 4,365,024 and 4,529,745 and supplied by Sloss Industries Corporation under the trademarks Foamstab 100 and 200. Generally, the surfactant comprises from about 0.05 to 10, and preferably from 0.1 to 6, weight percent of the foam-forming composition.

Any of the catalysts conventionally employed in the art to catalyze the reaction of an isocyanate with an isocyanate-reactive compound can be employed in the foam preparations of the invention. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1,3,3-tetramethylguanidine, N, N, N'N'-tetramethyl-1,3-butanediamine, N,N-dimethylethanolamine, N, N-diethylethanolamine, and the like. The catalysts generally comprise from about 0.1 to 20, and preferably from 0.3 to 10, weight percent of the total foam-forming composition.

In the preparation of the polyisocyanurate rigid foams, any catalysts known to catalyze the trimerization of isocyanates to form isocyanurates, and to catalyze the reaction of isocyanate groups with hydroxyl groups to form polyurethanes, can be employed. One preferred type of catalyst is a mixture of a tertiary amino phenol, such as 2,4,6-tris(dimethylaminomethyl)phenol (sold by Rohm and Haas Co. under the designation "DMP-30"), and an alkali metal carboxylate, such as potassium-2-ethyl hexoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about 0.4:1 to 2.5:1. Another preferred catalyst system is a mixture comprising (i) a salt of a low molecular weight carboxylic acid selected from the group consisting of an alkali metal salt and an alkaline earth metal salt and mixtures thereof (e.g., potassium acetate), (ii) a salt of a higher molecular weight carboxylic acid selected from the group consisting of an alkali metal salt and an alkaline earth metal salt and mixtures thereof, the higher molecular weight carboxylic acid having from about 5 to 30 carbon atoms (e.g. potassium octoate), and (iii) a tertiary amine (e.g., 2,4,6-tris [dimethylaminomethyl] phenol). This mixture is described in U.S. Pat. No. 4,710,521, whose disclosure is hereby incorporated by reference.

Other additives may also be included in the foam formulations. Included are processing aids, viscosity reducers, such as 1-methyl-2-pyrrolidinone, propylene carbonate, nonreactive and reactive flame retardants, such as tris(2-chloroethyl)-phosphate, other dispersing agents, reinforcing agents, plasticizers, mold release agents, stabilizers against aging and weathering, compatibility agents, fungistatic and bacteriostatic substances, dyes, other fillers and pigments, and other additives. The use of such additives is well known to those skilled in the art.

The polyisocyanurate and polyurethane foams can be prepared by mixing together the organic polyisocyanate with the isocyanate-reactive compound (e.g., polyol) and other foam-forming ingredients, including the carbon black and dispersing agent, at temperatures ranging from about 0° C. to 150° C. Any order of mixing is acceptable provided that the carbon black is homogeneously blended into the foam-forming formulation and the reaction of the polyisocyanate and isocyanate-reactive compound does not begin until all components are mixed. In a preferred embodiment, the dispersing agent is employed to form a uniform dispersion of the carbon black in the isocyanate, this dispersion is thoroughly mixed with the blowing or foaming agent and surfactant to form the A-component, and then the A-component is combined with the remaining components, whereupon the total mixture is foamed.

The foams may be produced by discontinuous or continuous processes, with the foaming reaction and subsequent curing being carried out in molds or on conveyors. The foam product may be suitably produced as a foam laminate by (a) contacting at least one facing sheet with the form-forming mixture, and (b) foaming the mixture. The process is advantageously conducted in a continuous manner by depositing the foam-forming mixture on a facing sheet(s) being conveyed along a production line, and preferably placing another facing sheet(s) on the deposited mixture. The deposited foam-forming mixture is conveniently thermally cured at a temperature from about 20° C. to 150° C. in a suitable apparatus, such as an oven or heated mold. Both free rise and restrained rise processes, such as disclosed in U.S. Pat. No. 4,572,865, may be employed in the foam production.

Figure 1:
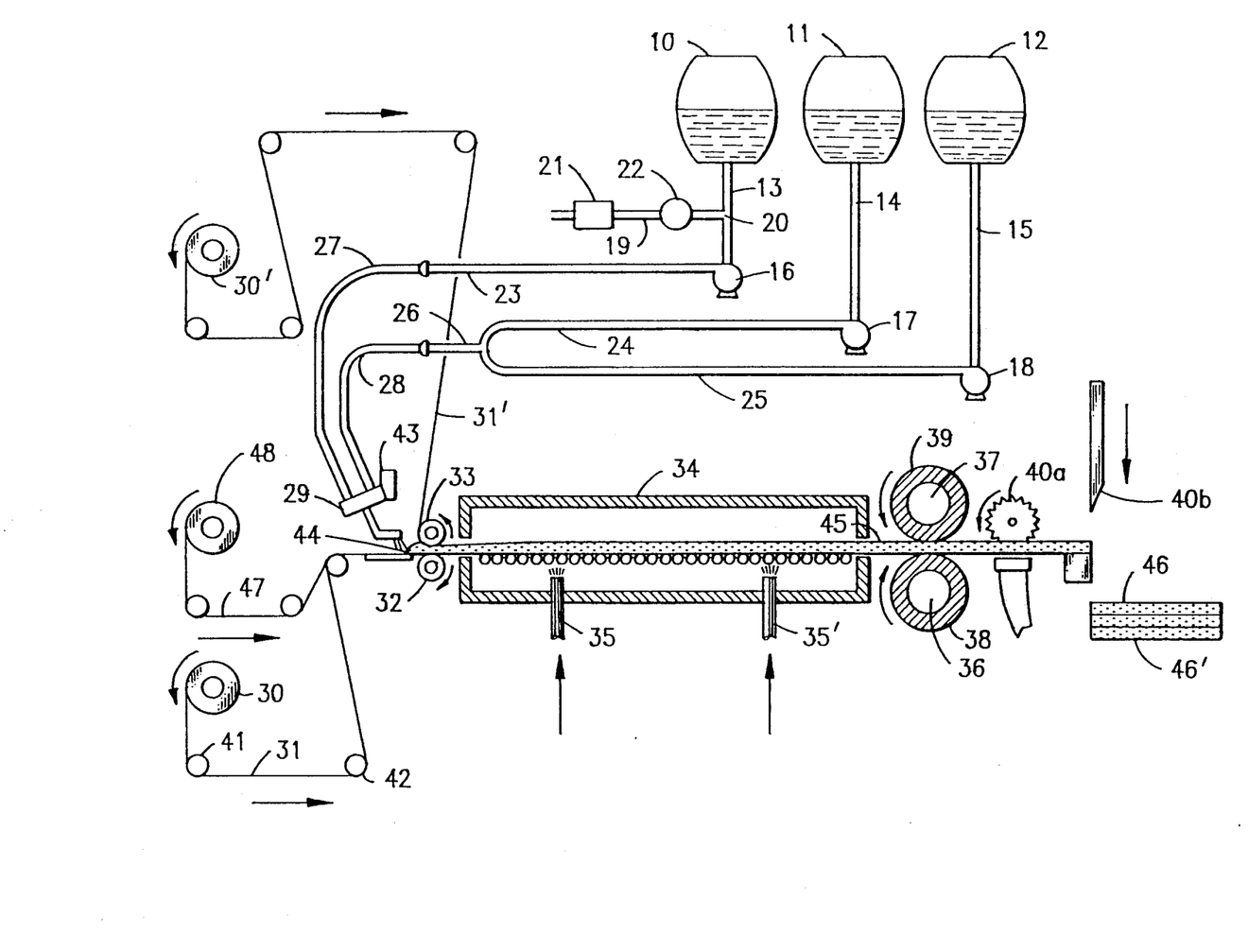

One preferred method of utilizing the carbon black/polyisocyanate dispersion in the foam-forming process of the invention can be illustrated with reference to the apparatus shown in the drawing. The apparatus includes tanks 10, 11 and 12 for containing the foamable ingredients and additives such as surfactant, dye, blowing agent, etc. The tanks are charged with the foam-forming mixture in whatever manner is convenient and preferred for the given mixture. For instance, in the production of an isocyanurate foam, the foam-forming mixture can be divided into three liquid components, with the carbon black/polyisocyanate mixture, surfactant, and blowing agent in tank 10, the polyol in tank 11, and the catalyst in tank 12, each respectively connected to outlet lines 13, 14 and 15. The temperatures of the ingredients are controlled to ensure satisfactory processing. The lines 13, 14 and 15 form the inlet to metering pumps 16, 17 and 18. The apparatus is also provided with a storage tank (not shown) for a frothing agent. This tank discharges into conduit 19 which opens at "T"-intersection 20 into line 13. A check valve 21 and ball valve 22 in conduit 19 ensure no backup of material toward the frothing agent storage tank. The frothing agent instead can be introduced in the same way into line 14 or both lines 13 and 14. The pumps 16, 17 and 18 discharge respectively through lines 23, 24 and 25. Lines 24 and 25 comprise branches which open into line 26, and lines 23 and 26 are in turn respectively connected to flexible lines 27 and 28. The flexible lines 27 and 28 discharge to mixing head 29. The apparatus is also provided with a roll 30 of lower facing material 31, and a roll 30' of upper facing material 31'. Where only a lower facing material is used, the upper facing material can be replaced with a web coated with a release agent. The apparatus is also provided with metering rolls 32 and 33, and an oven 34 provided with vents 35 and 35' for introducing and circulating hot air. The apparatus also includes pull rolls 36 and 37, each of which preferably has a flexible outer sheath 38 and 39, and cutting means 40a for cutting off side excess material and 40b for severing the faced foam plastic produced into finite lengths, thereby producing discrete panels.

As an example of the operation, tank 10 is charged with the organic polyisocyanate/carbon black dispersion, blowing agent and surfactant, tank 11 is charged with the polyol, and tank 12 is charged with the catalyst composition. The speeds of the pumps 16, 17 and 18 are adjusted to give the desired ratios of the ingredients contained in the tanks 10, and 12, whereupon these ingredients pass respectively into lines 13, 14 and 15. When a froth-foaming process is conducted, the frothing agent is injected into line 13 upstream of metering pump 16. The ingredients pass through lines 23, 24 and 25, as well as lines 26, 27 and 28, whereupon they are mixed in the mixing head 29 and deposited therefrom. By virtue of rotation of the pull rolls 36 and 37, the lower facing material is pulled from the roll 30, whereas the upper facing material is pulled from the roll 30'. The facing material passes over idler rollers such as idler rollers 41 and 42 and is directed to the nip between the rotating metering rolls 32 and 33. The mixing head 29 is caused to move back and forth, i.e., out of the plane of the drawing by virtue of its mounting on a reciprocating means 43. In this manner, an even amount of material can be maintained upstream of the nip between the metering rolls 32, 33. The composite structure at this point comprising lower and upper facing material 31 and 31' having therebetween a foamable mixture 44 now passes into the oven 34 and on along the generally horizontally extending conveyor. While in the oven 34, the core expands under the influence of heat added by the hot air from vents 35 and 35' and due to the heat generated in the exothermic reaction between the polyol and isocyanate in the presence of the catalyst. The temperature within the oven is controlled by varying the temperature of the hot air from vents 35, 35' in order to ensure that the temperature within the oven 34 is maintained within the desired limits of 100° F. to 300° F., and preferably 175° F. to 250° F. The foam, under the influence of the heat added to the oven, cures to form faced foam plastic 45. The product 45 then leaves the oven 34, passes between the pull rolls 36 and 37, and is cut by side edge and length cutting means 40a and 40b into finite lengths, thereby forming discrete panels 46 and 46' of the product.

Numerous modifications to the above-described apparatus will be immediately apparent to those skilled in the art. For example, the tanks 10, 11 and 12 can be provided with refrigeration means in order to maintain the reactants at subambient temperatures. In one modification, the frothing agent is not delivered into lines 13 or 14, but is admixed with the foam-forming ingredient(s) in tanks 10 and/or 11. This approach is especially advantageous for handling large amounts of highly volatile frothing agents, which can, for example, be apportioned in tanks 10 and 11 which are specially adapted (e.g., pressurized) to hold the frothing agent-containing formulations.

As shown in the drawing, a reinforcing web 47 can be fed into the apparatus. Fiberglass fibers constitute a preferred web material. For example, in a preferred embodiment the reinforcing web will be the type of glass mat used in producing the structural laminate of U.S. Pat. No. 4,028,158, i.e., a thin mat of long, generally straight glass fibers. By generally following the method of foam reinforcement described in Example 1 of U.S. Pat. No. 4,028,158 and utilizing a foam-forming mixture having the consistency of the liquid foamable mixture of this example, the glass mat becomes distributed within the foam core. In accordance with this embodiment, a thin mat 47 of glass fibers is fed from roll 48 toward the nip between the two rotating metering rolls 32 and 33. By virtue of rotation of the pull rolls 36 and 37, reinforcing mat 47 is pulled from its roll, through the nip of the metering rolls and downstream to form an expanded reinforcement material in the resulting structural laminate.

When the foam-forming mixture deposited on the underlying substrate during the process is in the form of a froth, an included reinforcing web, such as the thin glass mat of U.S. Pat. No. 4,028,158, will be pushed under the influence of the expanding froth to a position adjacent and interior to its associated facing sheet. In this way, a reinforcing web(s) can be placed interior to the lower or upper facing sheet or to both, as described in U.S. Pat. No. 4,572,865, the disclosure of which patent with respect to such reinforced structural laminates is hereby incorporated by reference.

Any facing sheet previously employed to produce building panels can be employed in the present invention. Examples of suitable facing sheets include, among others, those of kraft paper, aluminum, asphalt impregnated felts, and glass fiber mats as well as combinations of two or more of the above.

The foam materials of the invention can also be used, with or without a facer(s), for pipe insulation, pour-in-place applications, bunstock, spray foam and the like.

The invention is further illustrated by the following example in which all parts and percentages are by weight unless otherwise indicated.

EXAMPLE

This example illustrates (a) the preparation of a uniform dispersion of carbon black in a polyisocyanate and (b) the use of that dispersion in the formation of a number of rigid polyisocyanurate foam products by reference to the drawing.

A. DISPERSION OF CARBON BLACK IN ISOCYANATE

The mill used to disperse the carbon black in the isocyanate was a 250 gallon, high speed impingement mill (Kinetic Dispersions' Kady Mill). The mill was charged with 2000 lbs of Mondur MR-200 isocyanate and turned on. 38.6 lbs of the Dispersant (see Table below) were added and the ingredients were allowed to mix for 5 minutes. 186 lbs of Black Pearls 280 carbon black were then added slowly. Mixing was continued for about 45 minutes until a Hegman 8 level of dispersion was obtained.

B. A-COMPONENT PREPARATION

The above carbon black/isocyanate dispersion was used to prepare A-components according to the formulations shown in the Table below for Inventive foams A, C. and E. Comparative foams B, D and F were prepared in the absence of any carbon black and dispersant. The carbon black dispersion (or neat isocyanate) was charged to a 1000 gallon mix tank 10. Surfactant was then added during agitation. CFC-11 was added and the blend was allowed to mix for approximately 30 minutes.

C. LAMINATE PREPARATION

Structural laminates were prepared from the ingredients and quantities thereof shown in the Table. A free-rise process was employed. For each structural laminate, the B-component polyol was charged to tank 11, and the C-component catalyst was charged to tank 12. Laminates A and B utilized aluminum foil/kraft paper/aluminum foil facings. Laminates C and D utilized fibrous glass mat facings and froth foam. Laminates E and F utilized plain aluminum foil facings and core foam fibrous glass reinforcement.

In each case, Components A, B and C were brought together in a high pressure impingement foam head 29 in the proportions shown in the Table. In the case of Laminates C and D, the HCFC-22 ($CHClF_2$) was injected into the isocyanate-containing component at the opening formed into conduit 13. Top and bottom facings were fed together toward the nip of metering rolls 32 and 33. The foam forming mixture was deposited onto the lower facing 31 and metered between the nip rolls to establish the final product thickness. In the case of Laminates E and F, a thin mat 47 of fibrous glass was fed into the core foam with the lower facing. The laminates proceeded through oven 34 to yield each of foam boards A through F.

The properties shown in the Table reveal that the inventive carbon black-filled laminates (A, C and E) have improved insulation value over the unfilled laminates (B, D and F) and are very comparable with respect to the other foam properties.

TABLE

| | PRODUCTION OF STRUCTURAL LAMINATES | | | | | |
|---|---|---|---|---|---|---|
| INGREDIENTS | 10% TRIMER FOAMS | | 16% TRIMER FOAMS | | 18% TRIMER FOAMS | |
| (pts by wt) | A | B | C | D | E | F |
| A-Component: | | | | | | |
| Isocyanate[1] | 170.0 | 170.0 | 208.0 | 208.0 | 221.0 | 221.0 |
| Carbon black[2] | 15.8 | — | 19.3 | — | 20.5 | — |
| Dispersant[3] | 3.3 | — | 4.0 | — | 4.3 | — |
| Surfactant[4] | 2.0 | 2.0 | 3.5 | 3.5 | 2.0 | 2.0 |
| CFC-11 | 53.0 | 53.0 | 39.0 | 41.0 | 55.0 | 58.0 |
| HCFC-22 | — | — | 6.0 | 6.0 | — | — |
| B-Component: | | | | | | |
| Polyester polyol[5] | 130.0 | 130.0 | 92.0 | 92.0 | 79.0 | 79.0 |
| C-Component: | | | | | | |
| Catalyst[6] | 6.0 | 6.0 | 6.0 | 6.0 | 6.0 | 6.0 |
| FORM PROPERTIES: | | | | | | |
| Density, pcf | 1.75 | 1.70 | 1.77 | 1.69 | 1.80 | 1.67 |
| Closed cells, % | 89.7 | 88.7 | 84.3 | 89.6 | 85.7 | 87.1 |
| Oxygen Index | 22.25 | 21.75 | 23.25 | 23.50 | 25.75 | 25.00 |
| ASTM E-84 | | | | | | |
| Flame spread | 25 | 25 | 25 | 25 | 23 | 25 |
| Smoke | 76 | 108 | 72 | 68 | 35 | 51 |
| Compressive strength, psi | 21 | 27 | 29 | 31 | 22 | 25 |
| k-factor (ASTM C-518) | | | | | | |
| 30 days | 0.116 | 0.121 | 0.147 | 0.161 | — | — |
| 60 days | — | — | 0.154 | 0.167 | 0.117 | 0.138 |

FOOTNOTES:
[1]Isocyanate = polymethylene polyphenyl isocyanate which has an equivalent weight of 138, an acidity of 0.02% HCl, and a viscosity of 2,000 centipoises at 25° C., and is available from the Mobay Chemical Company under the trademark MONDUR MR-200.
[2]Carbon black = Black Pearls 280 supplied by Cabot Corporation.
[3]Dispersant = acetate capped ethoxylated nonyl phenol which contains 2 moles of ethylene oxide per mole of nonyl phenol and is supplied by Pelron Corporation.
[4]Surfactant = silicone surfactant supplied by the Union Carbide Corporation under the trademark Y-10222.
[5]Polyester polyol = reaction product of phthalic anhydride and diethylene glycol (DEG) which has a hydroxyl number of 224–244 and a viscosity at 25° C. of 2,500–3,000 cps, and is available from the Stepan Company under the trademark Stepanpol PS-2502A.
[6]Catalyst = mixture employed in the form of a solution in DEG in a weight ratio of 1.18 potassium acetate: 2.31 potassium octoate: 0.69 DMP-30: 5.82 DEG.

I claim:

1. A laminate comprising at least one facing sheet adhered to a closed cell, rigid, polymer foam which comprises the reaction product of a polyisocyanate and an isocyanate-reactive compound in the presence of (a) a foaming agent, (b) at least about 2 percent by weight of carbon black, based on the weight of the polymer in the foam, and (c) an endcapped polyoxyalkylene compound which is nonreactive with isocyanate groups, and is present in an amount sufficient to help bring about a uniform dispersion of the carbon black throughout the foam so that there is present in the cell walls of the foam an amount of predominantly non-agglomerated carbon black which reduces the aged k-factor of the foam to below the aged k-factor of the corresponding unfilled foam having the same density and prepared from the same foam-forming composition as the filled foam except that the carbon black is omitted and the amount of foaming agent is adjusted to equalize the densities of the filled and unfilled foams.

2. The laminate of claim 1 wherein the carbon black is present in the amount of from about 2 to about 10 percent by weight, based on the weight of the polymer in the foam.

3. The laminate of claim 2 wherein the carbon black has a mean particle diameter of from about 20 to about 100 nanometers.

4. The laminate of claim 3 wherein the polymer is selected from the group consisting of a polyurethane and a polyisocyanurate.

5. The foam of claim 4 wherein the polymer is a polyisocyanurate.

6. The laminate of claim 4 wherein the polyoxyalkylene compound is a capped alkoxylated nonyl phenol.

7. The laminate of claim 6 wherein the polyoxyalkylene compound is a capped ethoxylated nonyl phenol which contains about 1 to 4 moles of ethylene oxide per mole of nonyl phenol.

8. The laminate of claim 7 wherein the carbon black is a standard rubber-grade type falling under the classification of ASTM-550.

9. The laminate of claim 1 wherein the polymer is selected from the group consisting of a polyurethane and a polyisocyanurate, and comprises the reaction product of an aromatic polyisocyanate and an aromatic polyester polyol.

10. The laminate of claim 9 wherein the polyoxyalkylene compound is a capped ethoxylated nonyl phenol which contains about 1 to 4 moles of ethylene oxide per mole of nonyl phenol.

11. The laminate of claim 10 wherein the aromatic polyisocyanate is selected from the group consisting of phenylene diisocyanates, tolylene diisocyanates, diphenylmethane diisocyanates, polyphenyl polymethylene polyisocyanates, isocyanate terminated prepolymers made from said isocyanates, and mixtures thereof, and the aromatic polyester polyol is the reaction product of a polycarboxylic acid component and an aliphatic diol of the formula:

HO—R—OH wherein R is a divalent radical selected from the group consisting of:
(a) alkylene radicals each containing from 2 through 6 carbon atoms, and
(b) radicals of the formula:

—(R$^1$O)$_m$—R$^1$— wherein R$^1$ is an alkylene radical containing from 2 through 6 carbon atoms, and m is an integer of from 1 through 4, and
(c) mixtures thereof.

12. The laminate of claim 11 wherein the polymer is a polyisocyanurate.

13. The laminate of claim 11 wherein the carbon black has a mean particle diameter of from about 20 to about 100 nanometers, and is present in the amount of from about 4 to about 10 percent by weight, based on the weight of the polymer in the foam, and the ethoxylated nonyl phenol is present in the amount of from about 2 to 35 weight percent, based on the weight of the carbon black.

14. The laminate of claim 13 wherein the ethoxylated nonyl phenol contains about 1.5 to 2 moles of ethylene oxide per mole of nonyl phenol and is capped by acetic anhydride.

15. The laminate of claim 14 wherein the polycarboxylic acid component of the aromatic polyester polyol is selected from the group consisting of (a) ester-containing by-products from the manufacture of dimethyl terephthalate, (b) scrap polyalkylene terephthalates, (c) phthalic anhydride, (d) phthalic acid, (e) residues from the manufacture of phthalic acid or phthalic anhydride, (f) terephthalic acid, (g) residues from the manufacture of terephthalic acid, (h) isophthalic acid, (i) trimellitic anhydride, and (j) combinations thereof.

16. The laminate of claim 15 wherein the polymer is a polyisocyanurate.

17. The laminate of claim 16 wherein the carbon black is a standard rubber-grade type falling under the classification of ASTM-550.

18. The laminate of claim 1 wherein the polymer is selected from the group consisting of a polyurethane and a polyisocyanurate and the carbon black is present in the amount of from about 4 to about 10 percent by weight, based on the weight of the polymer in the foam.

19. The laminate of claim 18 wherein the polyoxyalkylene compound is a capped ethoxylated nonyl phenol which contains about 1.5 to 2 moles of ethylene oxide per mole of nonyl phenol.

20. The laminate of claim 18 wherein the polyoxyalkylene compound is a capped alkoxylated nonyl phenol.

21. The laminate of claim 20 herein the polymer is a polyisocyanurate and comprises the reaction product of an aromatic polyisocyanate and an aromatic polyester polyol.

22. The laminate of claim 21 wherein the polyoxyalkylene compound is a capped ethoxylated nonyl phenol which contains about 1 to 4 moles of ethylene oxide per mole of nonyl phenol.

23. The laminate of claim 22 wherein the ethoxylated nonyl phenol contains about 1.5 to 2 moles of ethylene oxide per mole of nonyl phenol.

24. The laminate of claim 23 wherein the aromatic polyisocyanate is selected from the group consisting of phenylene diisocyanates, toylene diisocyanates, diphenylmethane diisocyanates, polyphenyl polymethylene polyisocyanates, isocyanate terminated prepolymers made from said isocyanates, and mixtures thereof, and the aromatic polyester polyol is the reaction product of a polycarboxylic acid component and an aliphatic diol of the formula:

HO—R—OH wherein R is a divalent radical selected from the group consisting of:
(a) alkylene radicals each containing from 2 through 6 carbon atoms,
(b) radicals of the formula:

—(R$^1$O)$_m$—R$^1$— wherein R$^1$ is an alkylene radical containing from 2 through 6 carbon atoms, and m is an integer of from 1 through 4, and
(c) mixtures thereof.

25. The laminate of claim 24 wherein the carbon black is a standard rubber-grade type falling under the classification of ASTM-550.

26. A process for producing a laminate comprising
(a) contacting at least one facing sheet with an isocyanate-based polymer foam-forming composition containing a dispersion of carbon black, the carbon black being present in an amount of at least about 2 percent by weight, based on the weight of the polymer in the foam, and an end-capped polyoxyalkylene compound which is nonreactive with isocyanate groups being incorporated in the foam-forming composition, and
(b) thereafter foaming and curing the resultant filled foam-forming composition,
wherein the polyoxyalkylene compound is present in an amount sufficient to help bring about a uniform dispersion of the carbon black throughout the foam so that there is present in the cell walls of the foam an amount of predominantly non-agglomerated carbon black which reduces the aged k-factor of the foam to below the aged k-factor of the corresponding unfilled foam having the same density and prepared from the same foam-forming composition as the filled foam except that the carbon black is omitted and the amount of foaming agent is adjusted to equalize the densities of the filled and unfilled foams.

* * * * *